March 10, 1970  C. ZELNICK  3,499,612
TAPE MEASURE CONSTRUCTION INCORPORATING A
TAPELINE MOUNTED TAPE HOOK BUMPER
Filed April 1, 1968

INVENTOR
CHARLES ZELNICK
BY his attorneys,
Learman, Learman
& McCulloch 3,499,612
TAPE MEASURE CONSTRUCTION INCORPORATING A TAPELINE MOUNTED TAPE HOOK BUMPER
Charles Zelnick, Saginaw, Mich., assignor to Cooper Industries, Inc., Houston, Tex., a corporation of Ohio
Filed Apr. 1, 1968, Ser. No. 717,596
Int. Cl. B65h 75/16, 75/48
U.S. Cl. 242—84.8                                    11 Claims

ABSTRACT OF THE DISCLOSURE

A measuring tape construction including a casing having a tapeline opening and a spring to draw the tapeline into the casing except for the tapehook. A compressible spring strip mounted on the tapeline on the opposite side of the tape hook forms a tapeline return cushioning bumper. On retraction of the tapeline the spring strip is compressed sufficiently to allow its entry into the casing opening prior to the time the hook engages the casing and cushions the return of the hook.

---

Contempary "automatic return" tape measures utilize stress wound return springs having considerable torque and one of the problems which has been encountered in using such tape measures is the gradual destruction of the leading end of the tapeline by the constant hammering it receives as it is forcibly retrieved into the casing. Users quite frequently hold the tape retrieval button in depressed position until substantially the entire tapeline is returned to the casing at full speed and the tape hook slams into the casing under the full force of the torque produced by the return spring. The extreme shear load thus applied to the hook rivet or rivets will tend to tear them loose under the impact and there is, after such use, also a tendency for tapelines to split in the rivet area where the relatively thin tapeline has been weakened by the rivet holes.

It is a primary object of the present invention to provide a tape measure or measuring tape having a resilient bumper member provided on the tapeline in a position to absorb a large percentage of the impact load on the tapeline and cushion the shock of the returning hook so that the tape measure is not destroyed in a relatively short time even by inexperienced or careless users.

Another object of the invention is to provide a tapeilne mounted bumper which in no way interferes with the accuracy of measurements which are taken. Still a further object of the invention is to provide a highly reliable and durable tape measure of the character described which can be economically manufactured and assembled.

Other objects and advantages of the invention will be pointed out specifically or will become apparent from the following description when it is considered in conjunction with the appended claims and the accompanying drawings, in which:

Figure 1:
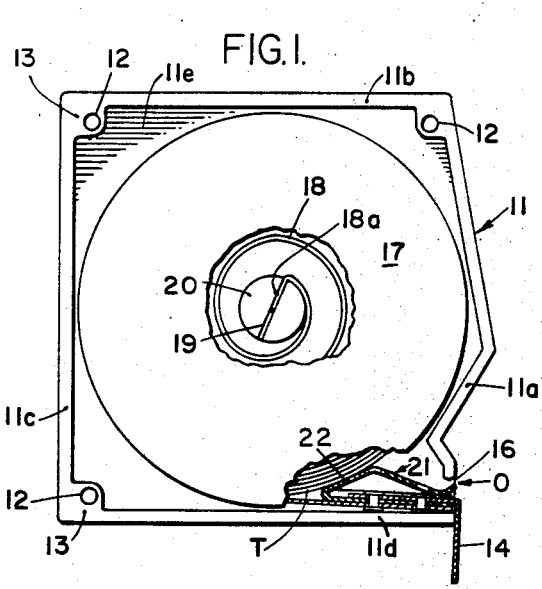
FIGURE 1 is a side elevational view of the tape measure with one of the side sections removed to exposed the interior thereof.
Figure 2:
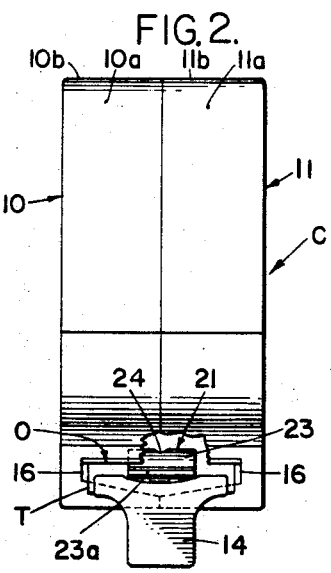
FIGURE 2 is a front elevational view of an assembled tape measure.

Referring now more particularly to the accompanying drawings, wherein I have shown a preferred embodiment of the invention only, the numerals 10 and 11 generally indicated preferably die cast tape casing side sections which respectively include front walls 10a and 11a, top walls 10b and 11b, rear walls 10c and 11c, bottom walls 10d and 11d and side walls 10e and 11e. Threaded openings 12 may be provided in eye members 13 provided on the casing section 11 and screws (not shown) may be utilized in the usual manner to extend through openings in the casing section 10 into the openings 12 to releasably secure the casing sections 10 and 11 in mated relation.

A tapeline generally designated T and having a tape hook 14 secured thereto by rivets 15 in the usual manner may be withdrawn from the tape casing, generally designated C, through a tape opening, generally designated O, formed by slots 16 provided in each casing section front wall 10a and 11a. The tapeline T is wound on a tape drum 17 which is powered by the usual return spring 18, the end of the spring 18 being secured in a slot 19 in a casing center post 20 as indicated in FIGURE 1. It will be observed that the tape hook 14 is less in width than the frontal tape opening O formed by the aligned slots 16 in the casing section front walls 10a and 11a.

Figure 3:
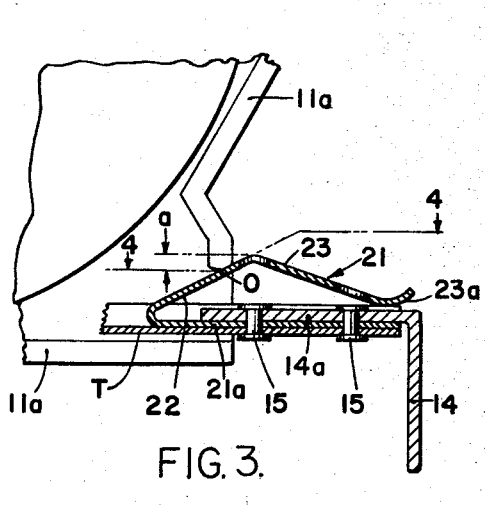
FIGURE 3 is a considerably enlarged fragmentary side elevational view further illustrating the compressible bumper.
Figure 4:
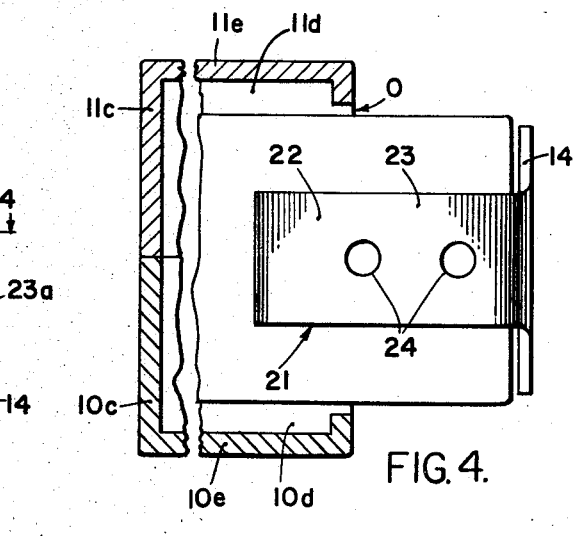
FIGURE 4 is a considerably enlarged fragmentary plan view taken on the line 4—4 of FIGURE 3.

Mounted between the dependent hook portion of tape hook 14 and a portion 14a which is secured to the tapeline T is a compressible spring member or bumper generally designated 21 which as FIGURE 3 clearly indicates normally projects a distance $a$ above the top of the tape opening O. The spring member 21, which is mounted inboard of the perpendicularly extending portion of the tape hook 14, includes an upwardly and forwardly inclined portion 22, extending from the portion 21a which is sandwiched between tape hook portion 14a and the tapeline T, and a portion 23 which extends forwardly and downwardly therefrom and terminates in an upwardly curvilinear shoe section 23a. Openings 24 may be provided in the strip 21 as shown which may be formed of spring steel.

As FIGURE 1 indicates, the bumper or strip spring member 21 is of such length that the portion 22 engages the coiled tape line T just prior to the tape hook 14 enages the lower walls 10d and 11d. Thus the retracting force imparted to the tapeline T is cushioned first of all by the front walls 10 and 11 compressing the spring member 21 so that it can enter the casing C as shown in FIGURE 1 and secondly by the portion 22 of the bumper 23 engaging the coiled tapeline T before the hook 14 engages the casing C.

In operation the casing C primarily absorbs the impact of the returning tapeline when the spring return button is pressed to withdraw it into the casing C through the opening O. Then, as noted, a further cushioning occurs when the portion 22 of the spring 23 meets the coiled tapeline T. Also the bumper member 21 serves as a tapeline latch. The impact shock is not transmitted to the hand to the extent there is any tendency to inadvertently drop the tape measure as sometimes occurs when conventional tape measures, which are not impact cushioned, are struck with the full force of the returning tape hook.

The invention is defined in the following claims.
What is claimed is:
1. In a measuring tape construction: casing means having a frontal tape opening therein; a tapeline coiled in said casing means and having a leading end extending out said opening; said tapeline including a retaining tape hook on said end extending angularly to one side of said tapeline to prevent said end from being drawn fully into said casing means; motor means within said casing means operable for drawing said tapeline into said casing means except for said tape hook; and resilient, compressible bumper means of greater size in one dimension, when combined with said tapeline than said tape opening, mounted by said tapeline inboard of said hook and on the opposite side of said tapeline to engage said casing means when the motor means is operating to retract said tapeline prior to the time the hook engages the casing.

2. The combination defined in claim 1 in which said bumper means comprises a strip portion secured to the upper face of the tapeline adjacent the hook and a portion extending upwardly and inclined forwardly with respect to the leading end of the tapeline which terminates in a downwardly and forwardly extending unsecured portion; the thickness of the tapeline plus the height of said bumper means being greater than the height of the tapeline opening in the casing so that the bumper means must be compressed to enter the opening and cushions the retracting stroke of the tapeline.

3. The combination defined in claim 1 in which said strip is spring steel material.

4. In a measuring tape construction: casing means having a frontal tape opening therein; a tapeline coiled in said casing means and having a leading end extending out said opening; said tapeline including a retaining tape hook on said end extending angularly to one side of said tapeline to prevent said end from being drawn fully into said casing means; motor means within said casing means operable for withdrawing said tapeline into said casing means except for said tape hook; and resilient, compressible bumper means, mounted by said tapeline inboard of said hook and on the opposite side of said tapeline to cushion the hook when the motor means is operating to retract said tapeline prior to the time the hook engages the casing.

5. The combination defined in claim 4 in which said bumper means comprises a strip portion secured to the upper face of the tapeline adjacent the hook and a portion extending upwardly and inclined forwardly with respect to the leading end of the tapeline which terminates in a downwardly and forwardly extending unsecured portion.

6. The combination defined in claim 4 in which said bumper means comprises leaf spring means secured to the upper face of the tapeline.

7. The combination defined in claim 4 in which said bumper means comprises an angle-shaped strip fixed at one end only to the top face of the tapeline so the other end can flatten out and move along the tapeline when it is compressed.

8. In a measuring tape construction: casing means having a frontal tape opening defined by marginal walls; a tapeline coiled in said casing means and having a leading end extending out said opening; said tapeline including a retaining tapehook on said end extending angularly to one side of said tapeline to prevent said end from being drawn fully into said casing means; motor means within said casing means operable for drawing said tapeline into said casing means except for said tapehook; and resilient, compressible bumper means mounted by said tapeline inboard of said hook and of said sufficient size in one direction to engage a marginal wall of said opening prior to the time the hook engages the casing, when the tapeline is being retracted; said bumper means being compressible to pass into said tape opening when the tapeline is retracted.

9. In a measuring tape construction, an assembly comprising: casing means having a frontal tape opening therein and a tapeline coiled in said casing means and having a leading end extending out said opening; said tapeline including a retaining tapehook on said end extending angularly to one side of said tapeline to prevent said end from being drawn fully into said casing means; motor means incorporated with said assembly operable for withdrawing said tapeline into said casing means except for said tapehook; and a resilient, compressible bumper, mounted by said tapeline inboard of said hook a predetermined distance to engage said assembly before said hook and cushion the hook when the motor means is operating to retract said tapeline.

10. The combination defined in claim 4 wherein a tape ramp is provided on the bottom of the casing leading to said tape opening and furnishes a tapeline guideway extending rearwardly from the botom edge of the tape opening.

11. The combination defined in claim 9 in which the bumper means engages the tapeline coil in said casing prior to the time the hook engages the casing on the retract stroke of the tapeline.

References Cited

UNITED STATES PATENTS

| | | | |
|---|---|---|---|
| 559,022 | 4/1896 | Barnes | 242—107.2 |
| 2,575,354 | 11/1951 | Mills | 242—84.8 |
| 2,616,635 | 11/1952 | Carlson | 242—107.2 |

NATHAN L. MINTZ, Primary Examiner

U.S. Cl. X.R.

242—107.2